United States Patent
Kroll (10) Patent No.: US 6,700,895 B1
(45) Date of Patent: Mar. 2, 2004

(54) METHOD AND SYSTEM FOR COMPUTATIONALLY EFFICIENT CALCULATION OF FRAME LOSS RATES OVER AN ARRAY OF VIRTUAL BUFFERS

(75) Inventor: James M. Kroll, Prospect Heights, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/526,649

(22) Filed: Mar. 15, 2000

(51) Int. Cl.[7] .............................................. H04L 12/24
(52) U.S. Cl. ...................... 370/412; 370/498; 370/516
(58) Field of Search ................................ 370/389, 412, 370/498, 252, 516; 709/231, 214; 711/148

(56) References Cited

U.S. PATENT DOCUMENTS

| | | | | |
|---|---|---|---|---|
| 4,652,874 A | * | 3/1987 | Loyer | 370/451 |
| 5,235,593 A | * | 8/1993 | Grow et al. | 370/452 |
| 5,949,780 A | * | 9/1999 | Gopinath | 370/389 |
| 5,991,305 A | * | 11/1999 | Simmons et al. | 370/422 |
| 6,125,397 A | * | 9/2000 | Yoshimura et al. | 709/235 |
| 6,175,871 B1 | | 1/2001 | Schuster et al. | 709/231 |
| 6,366,959 B1 | | 4/2002 | Sidhu et al. | 709/231 |
| 6,389,032 B1 | * | 5/2002 | Cohen | 370/412 |
| 6,452,950 B1 | * | 9/2002 | Ohlsson et al. | 370/516 |

OTHER PUBLICATIONS

Schulzrinne/Casner/Frederick/Jacobson, *RTP: A Transport Protocol For Real–Time Applications, Internet Engineering Task Force Memo*, Oct. 21, 1999, pp. 1–100.

* cited by examiner

Primary Examiner—Huy D. Vu
Assistant Examiner—Daniel Ryman
(74) Attorney, Agent, or Firm—McDonnell Boehnen Hulbert & Berghoff (57) ABSTRACT

A method and system for selecting an optimal size of a jitter buffer in a real time communications system includes calculating a frame loss rate from packet arrival statistics. The packet arrival statistics include determining an average queue time a frame spends in a jitter buffer and determining the difference between an expected arrival time and actual arrival time of a sample of data packets into a receiver. The frame loss rate is calculated by considering the frames that arrive late, frames that are lost in the network and frames that overflow due to an arriving burst of frames.

5 Claims, 8 Drawing Sheets

METHOD AND SYSTEM FOR COMPUTATIONALLY EFFICIENT CALCULATION OF FRAME LOSS RATES OVER AN ARRAY OF VIRTUAL BUFFERS

FIELD OF INVENTION

The present invention relates to real-time data communications over packet switched networks and, more particularly, to the calculation of frame loss rates relating to such communications.

BACKGROUND OF THE INVENTION

Real time communications such as audio or video can be encoded using various compression techniques. One or more frames of encoded information can then be placed in a data packet with time and sequence information and transported via non-guarantee Quality of Service (QoS) packet networks. A stream of such packets may be used to transfer real time audio or video information. Non-guaranteed packet switched networks include a Local Area Network (LAN), Internet Protocol Network, Frame Relay Network, or an interconnected mixture of such networks such as an Internet or Intranet. One underlying problem with non-guaranteed packet networks is that transported packets are subject to varying loss and delays. Therefore, for real-time communications, a tradeoff exists among the quality of the service, the interactive delay, and the utilized bandwidth. This tradeoff is a function of the selected coding scheme, the packetization scheme, the redundancy of information packeted within the packets, the receiver buffer size, the bandwidth restrictions, and the transporting characteristics of the transporting network.

The transmission of real time communications over packet switched networks presents several challenges. A general problem encountered in packet switched networks, is that the network may drop or lose data packets. Packets may also experience excessive delay during transportation from the sender to the receiver. Therefore, some of the packets at a receiving destination will be missing and others will arrive out of order. Another problem is the maintenance of a synchronous play-out of frames to the decoder, given that the packet arrival times are non-deterministic. The uncertainty in the arrival time of any packet in a packet stream is referred to as jitter. Typically, this problem is addressed using a jitter buffer.

The jitter buffer waits for the reception of some number of frames before play-out of the data frames begins. The threshold number of frames in the buffer during transmission is typically known as a watermark. In this way, if subsequent packets are slightly early or slightly late, they are still likely to arrive in time for their scheduled play-out.

The workings of the jitter buffer itself presents different challenges. For example, if the buffer is made very large, the inherent delay of the jitter buffer may exceed the channel jitter, and the system receives all packets in time for their respective play-out. However, the disadvantage of having a very large buffer is that a large delay is added to the system. This may be unacceptable in a real time voice or video session. Conversely, if the buffer is made very small, there will be an excessive number of late frames which cannot be played on time. This will degrade the quality of the reconstructed signal.

One approach to finding the proper trade-off between delay and late frames is to use a dynamic jitter buffer. Such a buffer dynamically adjusts its size and introduces buffering delay in proportion to the true channel jitter.

If it is assumed that the packet arrival statistics are stationary, then the frame loss performance in the past should be identical to that in the future, for any static buffer size. In practice, it is relatively easy to monitor the frame loss rate at the output of a jitter buffer. Given this hypothesis regarding the packet arrival statistics, a prediction of future frame loss performance can be made. Of interest is the frame loss as observed at the output of the jitter buffer. Frame loss can result from the loss of packets over the network, from packets that arrive partially or entirely too late to decode, or from a burst of packet arrivals to the jitter buffer in a short period of time such that the buffer overflows.

Given the assumption of stationary jitter statistics, it would be useful to have a method to calculate the past frame loss performance for a range of buffer sizes. One solution that has been implemented uses an array of "virtual" buffers. The solution uses a total of N buffer sizes. One real buffer is implemented along with N−1 virtual buffers. A virtual buffer applies all the logic, state transitions and variable monitoring that the real buffer does. The frame loss rate of any virtual buffer is determined by treating that buffer as if it holds actual frames. The packet flow into and out of each buffer is monitored and the loss count is incremented as lost frames are identified. The difference is that no payload data is ever really loaded into or out of the virtual buffers. However, the virtual buffers require a great deal of complex computation.

Therefore, there still is a need to efficiently calculate frame loss rates over the virtual buffers which requires a lower level of processing.

SUMMARY OF THE INVENTION

In accordance with preferred embodiments of the present invention, some of the problems associated with data transmission over packet switched networks in the prior art are overcome. The present invention includes a system and a method to calculate frame loss rates associated with jitter buffers of varying sizes to dynamically select the size of a jitter buffer to implement. Specifically, packet arrival times are used to infer what the frame loss rates are for arbitrarily sized buffers. Of interest is the frame loss rate as observed at the output of the jitter buffer. The system of the present invention includes, but is not limited to, one frame per packet. The frame loss data can be used to select a buffer size with a desirable trade-off between loss and delay. The system and method of the present invention reduces the burden on the system hardware and software as a lower level of processing is required.

In a preferred embodiment, the method for selecting an optimal size of a buffer in a communications system for transmitting real time communication includes computing an average queue time of a frame in the jitter buffer and determining expected arrival times of a sample of data frames. The method also includes creating a matrix having at least a first row, a second row and m number of columns, by placing the comparative times between actual and expected arrival times of data packets in the first row. Further, the method includes determining a number of late, a number of lost and a number of overflowed frames. The matrix is then adjusted to account for at least one of late, lost or overflowed frames. The method further includes determining a total loss rate of the frames, and comparing the loss rate determined to a desired loss rate of the frames. An optimal size of the jitter buffer is then selected that approximates the desired loss rate.

In another preferred embodiment the system of the present invention includes a control system for selecting an optimal size of a buffer in a communication system for transmitting real time communications. The control system includes a jitter buffer of selectable size to receive data packets and a controller for evaluating packet arrival statistics to determine a frame loss rate. The controller further selects a value for the size of the jitter buffer which approximates a desired loss rate.

The foregoing and other features and advantages of the present invention will be more readily apparent from the following detailed description of an embodiment of the present invention, which proceeds with references to the accompanying drawings. As illustrated in the accompanying drawings, like reference characters refer to the same parts throughout the different views. The drawings are not necessarily to scale, emphasis instead being placed upon illustrating the principles of the invention.

BRIEF DESCRIPTION OF THE DRAWINGS

Particular embodiments of the present invention are described below with reference to the following drawings, wherein.

DETAILED DESCRIPTION OF PREFERRED EMBODIMENTS

The present invention is directed towards a system and a method for calculating frame loss rates associated with multiple jitter buffers of varying size, without committing the computational resources required to actually implement the multiple buffers. In the present invention, the packet arrival data is used to infer what the frame loss rate is for each of the buffer sizes. The method according to the present invention focuses on the frame loss observed at the output of the jitter buffer. The frame loss data may then be used to select a buffer size with a desirable trade-off between loss and delay.

Figure 1:
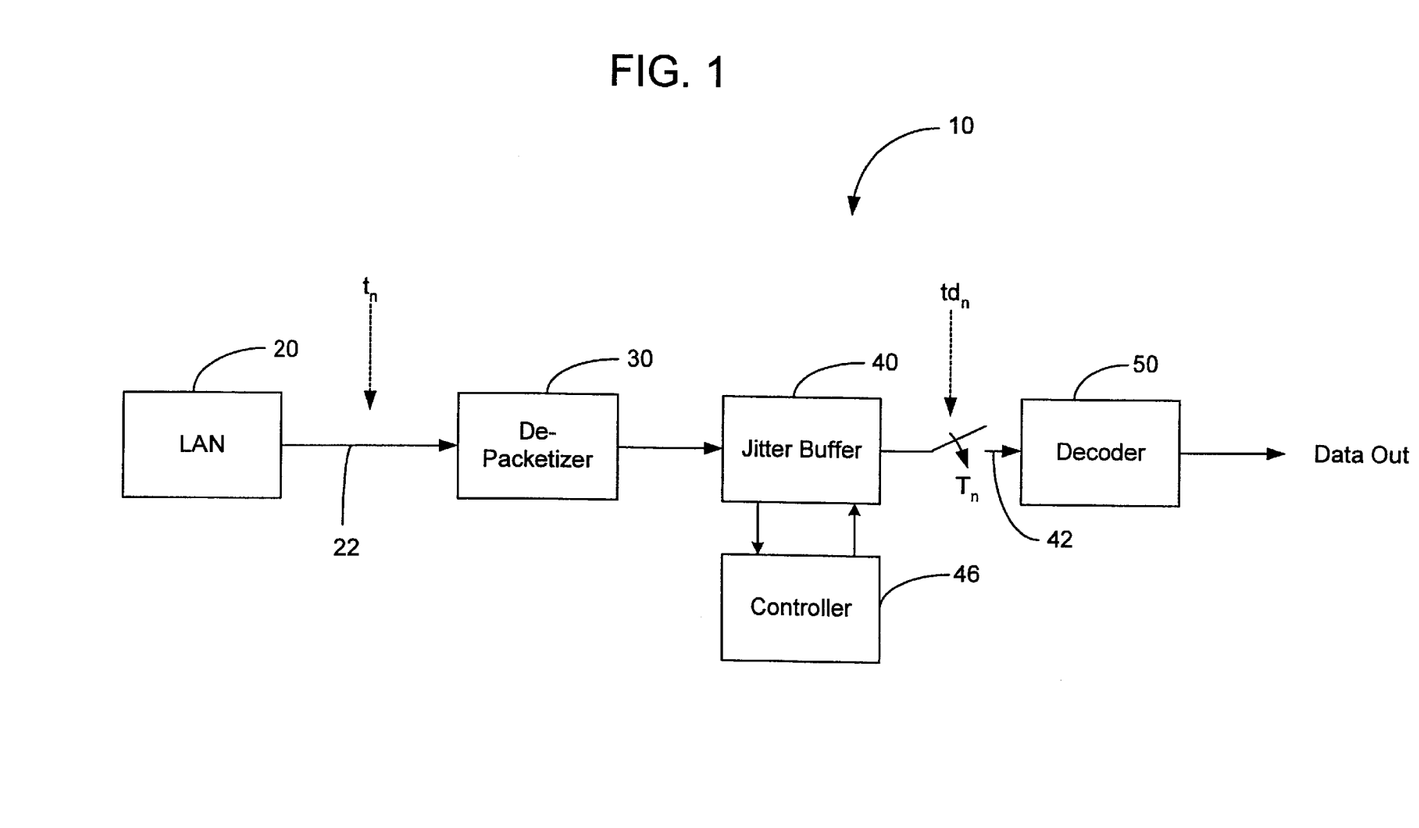
FIG. 1 is a block diagram illustrating an example of a conventional receiver system that includes a conventional jitter buffer.

The present method assumes that the packet arrival statistics, i.e. the statistical characteristics of packet stream over the channel through LAN 20 in FIG. 1, are static. Thus, the frame loss performance in the past is assumed to be identical to the future frame loss for the packet stream given a particular jitter buffer size. Therefore, the past packet arrival statistics can be used to predict future frame loss performance for a given buffer size. The system is assumed to include, but not limited to, one frame per packet. The present invention thus predicts the frame loss rates of arbitrary buffer sizes based upon the arrival statistics for a sample of the packet stream through the network channel. In particular, the arrival time for the $n^{th}$ packet $t_n$, can be compared to the expected arrival time for this packet, $t_{En}$. A vector of ($t_n-t_{En}$) over n can be used to predict the loss rates for arbitrary sized buffers, without actually implementing any virtual buffers. This technique is both accurate and computationally efficient.

FIG. 1 is a simplified functional block diagram showing an example of a communication system receiver 10 for receiving data packets over a packet switched channel through local area network (LAN) 20. In the system of FIG. 1, the LAN 20 introduces channel jitter, where packets are delayed and may be received out of order. Packets are received off the LAN and handed to de-packetizer 30 via circuit node 22. A header is stripped off of each packet by the de-packetizer 30, and the payload which is output from the de-packetizer includes one or more frames and a sequence number, which are stored in jitter buffer 40. Packets can be output from the jitter buffer 40 in an order given by their respective sequence numbers provided that they arrive before their respective play-out time. An example of a protocol that includes sequence numbers for purposes of reconstructing data in real-time order is the Real Time Protocol (RTP). More information regarding the RTP protocol is available from the Internet Engineering Task Force site at www.ietf.org.

The size of jitter buffer 40 is typically expressed as an integer number of frames. Jitter buffer 40 dequeues a frame from jitter buffer 40 at a regular frame interval $T_d$ and in a sequence defined by controller 46 and outputs it at circuit node 42 for input to decoder 50. Decoder 50 decodes the frames in order to reconstruct the original signal that was encoded and packetized by an entity at the other end of a connection through LAN 20. In this particular implementation, the sampling time ($t_n$) at node 22 where the system pulls frames into jitter buffer 40 is a continuous random variable. The delay through the de-packetizer 30 is assumed to be negligible. The time ($td_n$) where frames are depleted from jitter buffer 40 is discrete and uniform.

In one example of an embodiment of receiver 10, it is assumed that there is one frame per packet and each frame has a unique RTP sequence number (RTP_seq_num) associated with it. RTP seq_num is extracted from each packet by de-packetizer 30 and passed to jitter buffer 40 along with the incoming frame from the payload. The RTP_seq_num is used in a control process of controller 46 for jitter buffer 40 to identify late packets and for frame re-ordering. A variable called current_seq_num is used to identify the sequence number of the next frame to play-out from jitter buffer 40. The value of current_seq_num is incremented once per frame interval.

Another variable called frame_num is used to track the total number of frames currently stored in the jitter buffer 40 and awaiting play-out.

Figure 2:
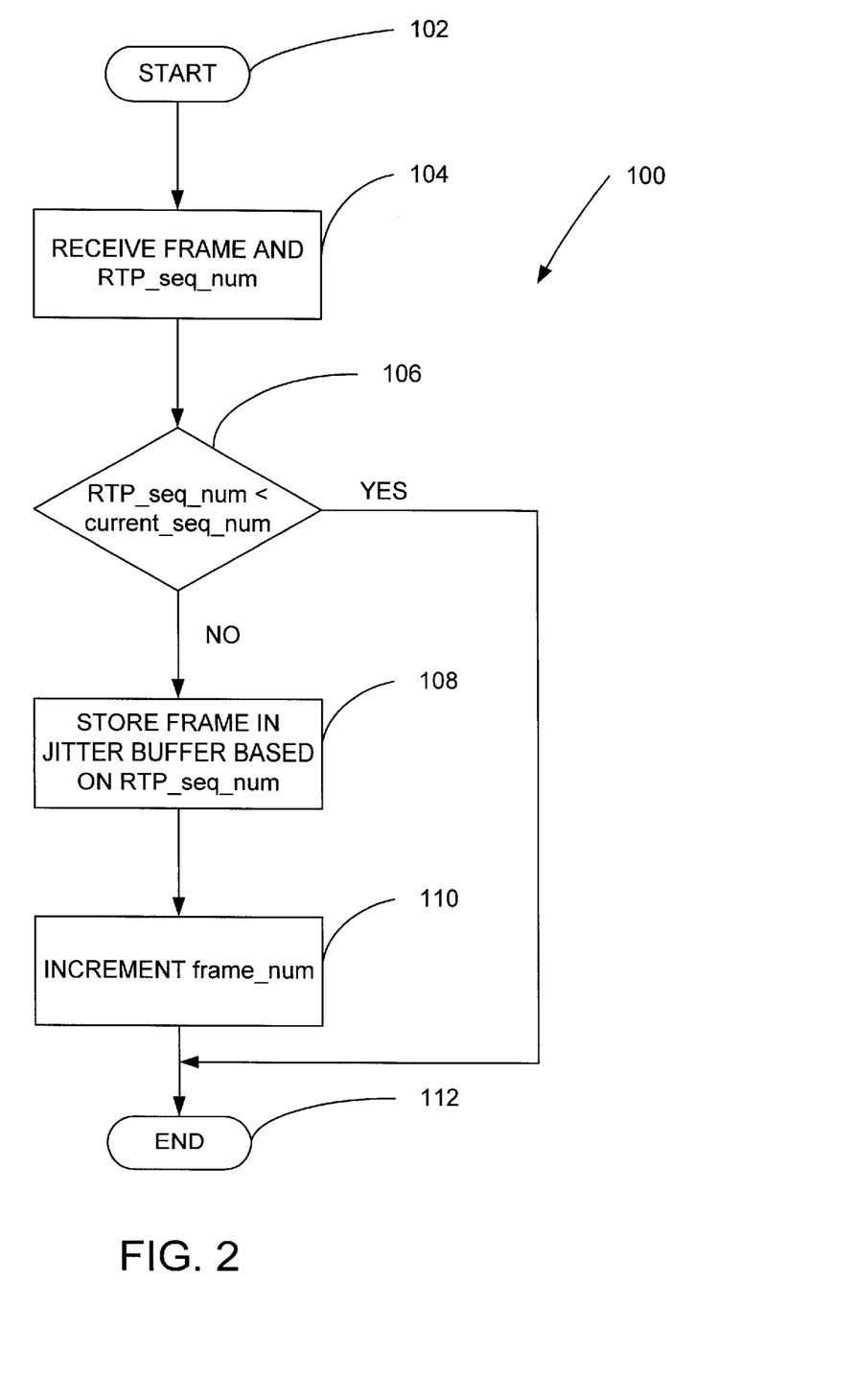
FIG. 2 is a flowchart illustrating a process which includes a frame being output from a de-packetizer.

FIG. 2 is a control flow diagram describing an example of a process 100 within jitter buffer 40 and controller 46 that runs when a frame is output from de-packetizer 30 to jitter buffer 40. Process 100 enters at start 102 when a frame is detected at the input of jitter buffer 40. At step 104, jitter buffer 40 receives the frame from de-packetizer 30 along with the RTP_seq_num value for the frame. At step 106, if it is determined that the RTP_seq_num is not less than current_seq_num, then the process proceeds to the next step 108. If however, it is determined that RTP_seq_num is less than the current_seq_num, then the particular frame can be discarded and the process proceeds to the end. At step 108, jitter buffer 40 stores the frame based upon its corresponding RTP_seq_num value. At step 110, the value of frame_num is incremented as the process ends at step 112.

Jitter buffer 40, waits for the reception of a predetermined number of frames before play-out from the jitter buffer begins. In this way, if subsequent packets are slightly early or slightly late, the frame payloads are still likely to arrive in time for their scheduled play-out. It should be noted that the arriving frames are input and loaded into the jitter buffer 40 contiguously. In a particular embodiment, the frames are accessed using pointers and sequence numbers.

Figure 3:
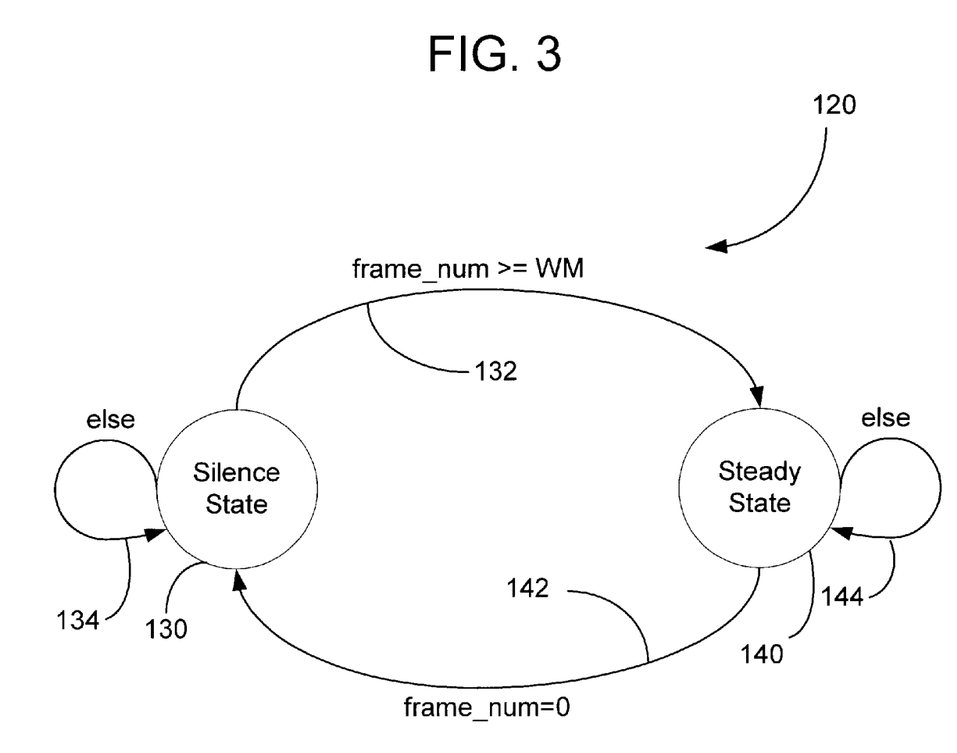
FIG. 3 is a state diagram illustrating an example of a frame output control machine.

FIG. 3 is a state diagram illustrating an example of a frame output control machine 120. The frame output control machine executes within the controller 46. Frame output control machine 120 has a silence state 130 during which no frames are output from jitter buffer 40 to the decoder 50. If, as frames are received from de-packetizer 30, the number of frames frame_num in jitter buffer 40 reaches or exceeds a watermark value WM, then state machine 120 traverses edge 132 to steady state 140. If frame_num remains less than WM, then edge 134 is traversed and state machine 120 remains in silence state 130.

When state machine 120 is in steady state 140, controller 46 drives jitter buffer 40 to output a frame to decoder 50 at every frame interval $T_d$ based on the current_seq_num. While there are frames in jitter buffer 40, state machine 120 will traverse edge 144 and remain in steady state 140. However, if the incoming frame rate does not keep pace with the frame interval $T_d$, then frame_num will eventually decrement to zero and state machine 120 will traverse edge 142 back to silence state 130 to await additional frames.

The watermark WM value ideally corresponds to the average number of frames in the jitter buffer during steady state operation. There are generally two types of jitter buffers: odd and even. The number of frames in an "even" buffer will fluctuate between 0 and 2*WM, inclusively. The number of frames in an "odd" buffer will fluctuate between 0 and 2*WM+1, inclusively. Typically, if jitter buffer 40 is full when a new frame arrives, e.g. frame_num=2*WM for an even buffer or frame_num=2*WM+1 for an odd buffer, then the associated frame is not placed in the jitter buffer but is, instead, discarded. Furthermore, if a packet arrives too late to be played out in its proper sequence, i.e. RTP_seq_num <current_seq_num, then the associated frame is discarded.

As an example for the value of WM, consider a system where 40 milliseconds (ms) of jitter compensation is desired. Using a frame interval $T_d$ value of 30 ms, the minimum value for WM that provides 40 ms of jitter compensation is 2 frames.

Figure 4:
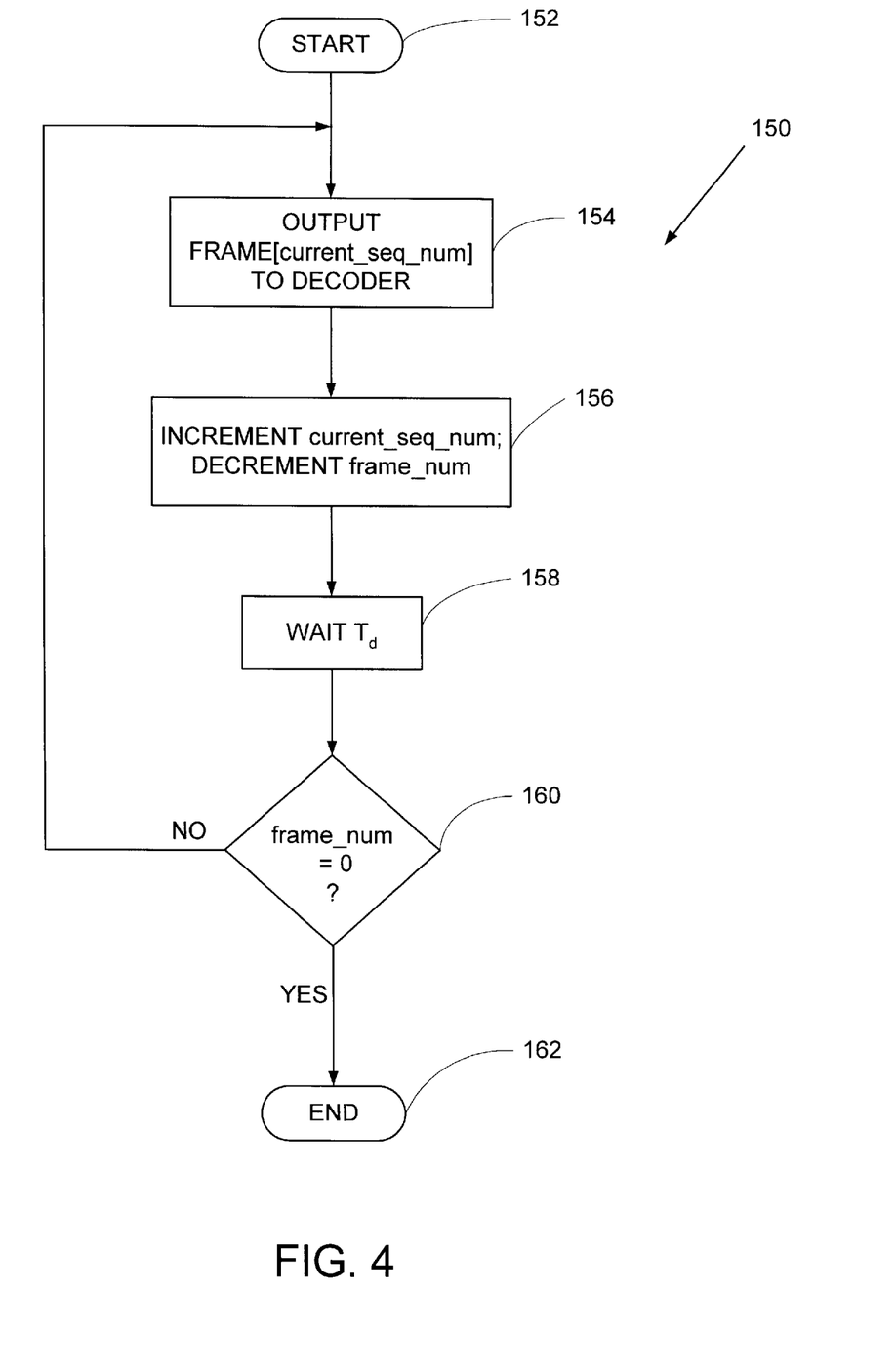
FIG. 4 is a flowchart illustrating an exemplary output process preformed in steady state.

FIG. 4 is a control flow diagram illustrating an example of the output process performed in steady state 140 of FIG. 3. When state machine 120 enters steady state 140, output process 150 is entered at step 152 and begins outputting, at step 154, the frame indicated by the current_seq_num value from jitter buffer 40 to decoder 50 of FIG. 1. The value of current_seq_num is then incremented and the value of frame_num is decremented at step 156. Process 150 then waits at step 158 for the remainder of the frame interval $T_d$ before attempting to output another frame.

When the frame interval $T_d$ has timed out at step 158, the value of frame_num is checked at step 160. If frame_num equals 0, then no more frames remain in jitter buffer 40 and control flow proceeds to step 162 where state machine 120 of FIG. 3 traverses edge 142 to transition to silence state 130. However, if frame_num does not equal 0, then control flow branches back to step 154 for the output of another frame from jitter buffer 40. It should be noted that process 100 of FIG. 2 may be running concurrently with process 150 and placing additional frames in jitter buffer 40.

While the process of receiving and playing out frames seems simple, there are actually many subtle challenges that need to be addressed. For instance, as noted above, if the frame capacity of jitter buffer 40 is made very large, then the inherent delay of the jitter buffer will exceed the channel jitter of the channel through LAN 20 and the system will receive all packets in time for their respective play-out. However, the disadvantage of such an approach is that a large amount of delay is added to the system. This may be unacceptable in a real time voice or video session. Conversely, if the frame capacity of jitter buffer 40 is made very small, then the delay introduced by the jitter buffer is also small and the likelihood of packets arriving too late to be fully decoded will increase. This will result in frame loss at the output of the jitter buffer 40.

Late arriving packets is one source of frame loss. Frame loss can also result from the loss of packets over the network, or from a burst of packet arrivals to the jitter buffer in a short period of time such that the buffer overflows. The result of frame loss is the degradation of the quality of the reconstructed signal.

One approach to finding the proper trade-off between delay and late packets is to use a dynamic jitter buffer. As the name suggests, a dynamic jitter buffer dynamically adjusts its size and introduces buffering delay in proportion to the measured value of the channel jitter.

One approach to the implementation of a dynamic jitter buffer involves the use of an array of virtual buffers as described in U.S. Pat. No. 6,175,871 to Schuster et al. and U.S. Pat. No. 6,366,959 to Sidhu et al., for example, both of which are incorporated herein by reference in their entirety. A total number of N buffers are considered, where one real buffer and N−1 virtual buffers of various sizes are implemented. Each virtual buffer includes the same logic, state transitions and variable monitoring that is discussed above. However, each virtual buffer is really a model of a buffer and no payload data is loaded into or out of any of the virtual buffers. The frame loss at the ouput of each of the buffers is monitored and one of several criteria are used to select the appropriate size of the real buffer. However, the computational resources required to model N−1 virtual buffers, with all their associated processing, is considerable.

The method of the present invention differs from the virtual buffer approach in that the frame loss rates of arbitrary buffer sizes are predicted based solely on the arrival statistics. In particular, the arrival time for the $n^{th}$ packet $t_n$, can be compared to the expected arrival time for this packet, $t_{En}$. A vector of $(t_n-t_{En})$ over n can be used to predict the loss rates for arbitrary sized buffers, without implementing any virtual buffers. This method is both accurate and computationally efficient.

Figure 5:
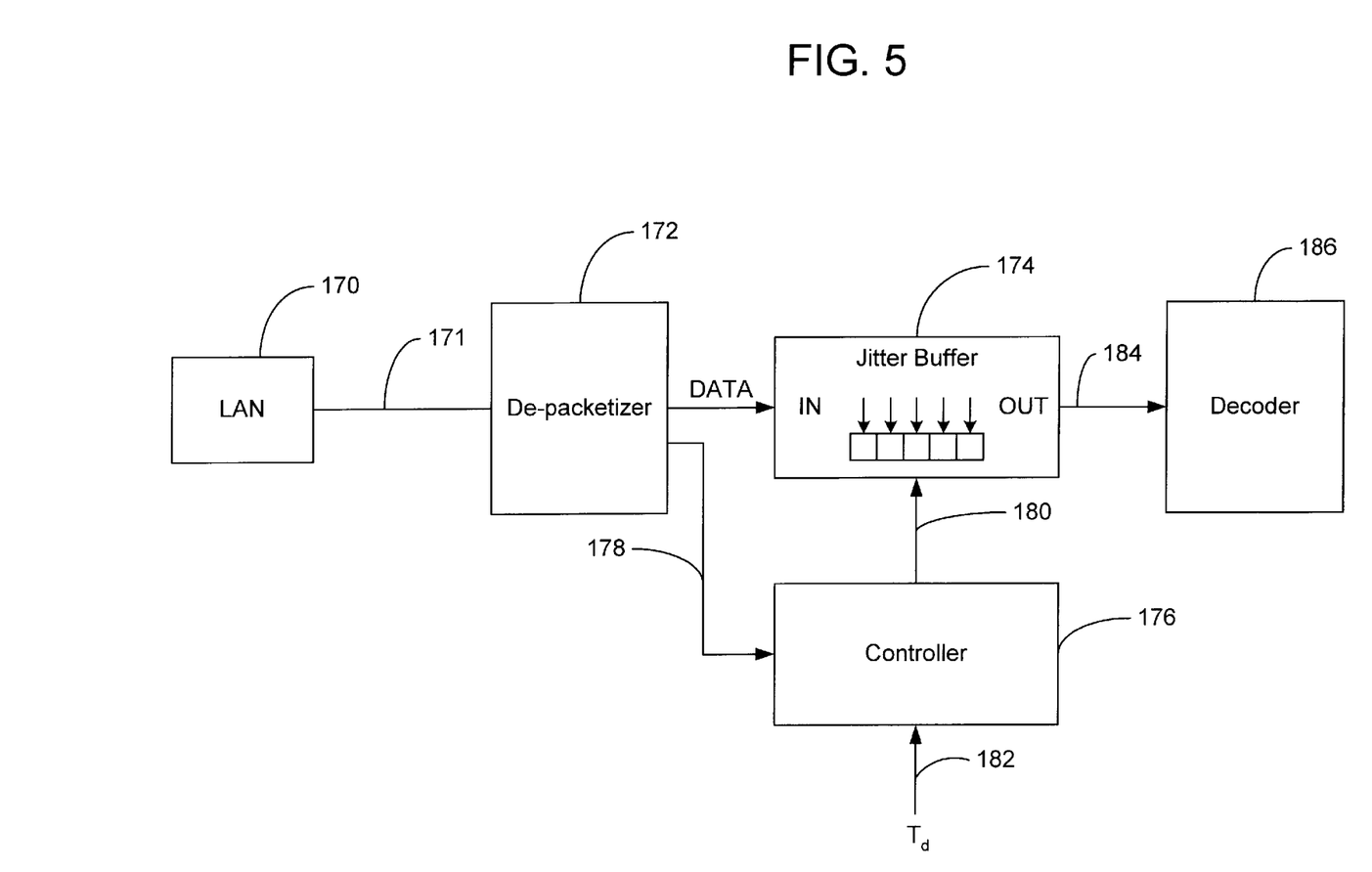
FIG. 5 is a block diagram of a preferred embodiment of a communication system in accordance with the present invention.

FIG. 5 is a block diagram illustrating a preferred embodiment of a communication system in accordance with the present invention. Similar to FIG. 1, data packets are received over a packet switched channel through LAN 170, and handed to the de-packetizer 172 via circuit node 171. The header is stripped off of each packet by the de-packetizer 172, and the payload includes one or more frames and a sequence number which are stored in the jitter buffer 174 provided that the frames are not late as per step 106 as illustrated in FIG. 2. The controller 176 controls the calculation of the frame loss rates and the computation to dynamically select the size of the jitter buffer to implement. Thus, the controller receives input 178, from the de-packetizer 172 such as, for example, the arrival times of the incoming packets. The controller outputs control signal

180, that controls for example, the size of the jitter buffer 174 to implement, the sequence number of the frames to output and the timing of the frame output according to $T_d$ 182. The frames that are dequeued from the jitter buffer are output at the circuit node 184 for input to decoder 186 in the order given by their respective sequence numbers. The decoder 186 decodes the frames in order to reconstruct the original signal that was encoded and packetized by an entity at the other end of a connection through LAN 170.

Figure 6:
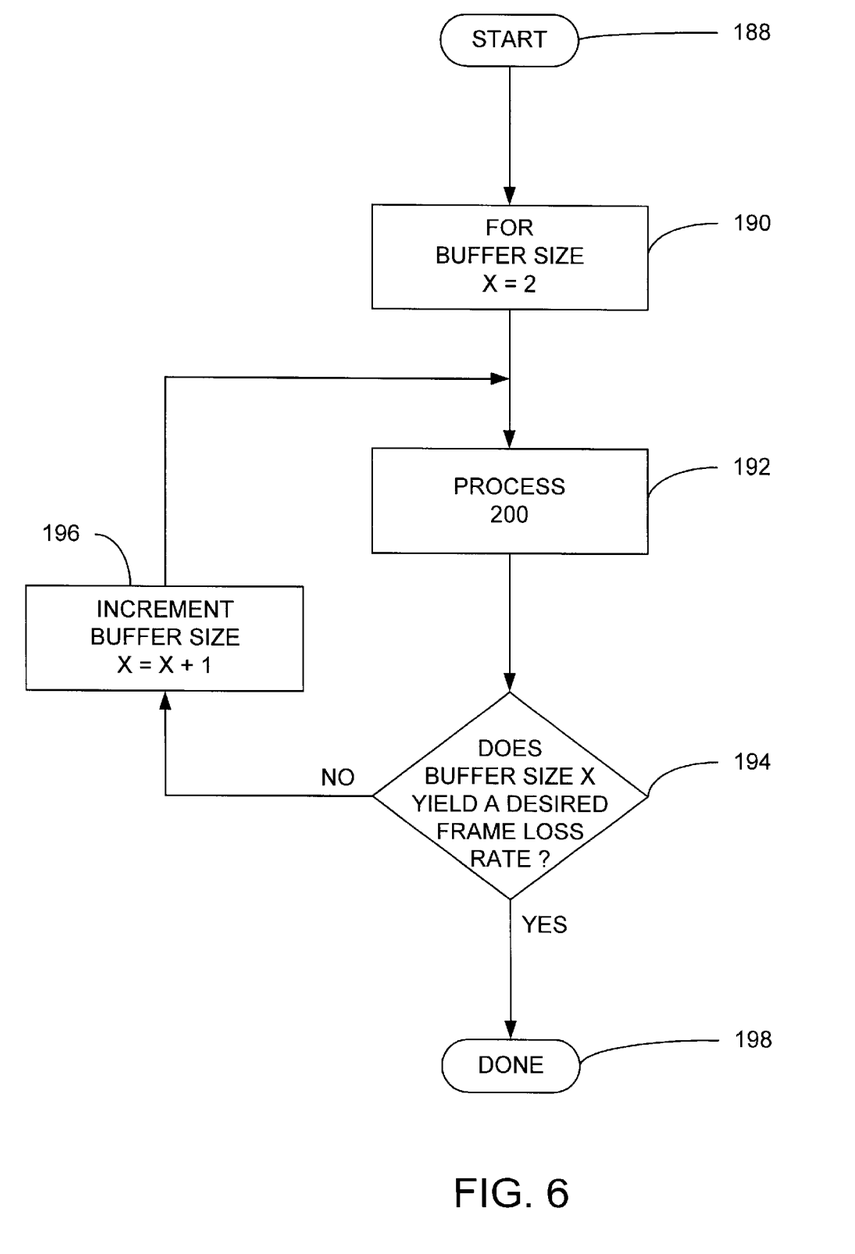
FIG. 6 is a flowchart of a process of a preferred embodiment in accordance with the present invention.

FIG. 6 is a flowchart illustrating a method of a preferred embodiment of the present invention. The process to select a buffer size that approximates a desired frame loss rate begins at step 188. The jitter buffer is selectable in size and thus includes a plurality of sizes. For a jitter buffer of size x=2 per step 190, the frame loss rate is calculated per process 200 at step 192, which is described in detail hereinafter. At step 194, if the buffer size calculated approximates the frame loss desired, then the process is completed per step 198.

If however, the buffer size calculated does not provide a desired frame loss rate, at step 194, then the buffer size is incremented in step 196 and the process 200 is repeated till the desired frame loss rate is approximated.

Figure 7A:
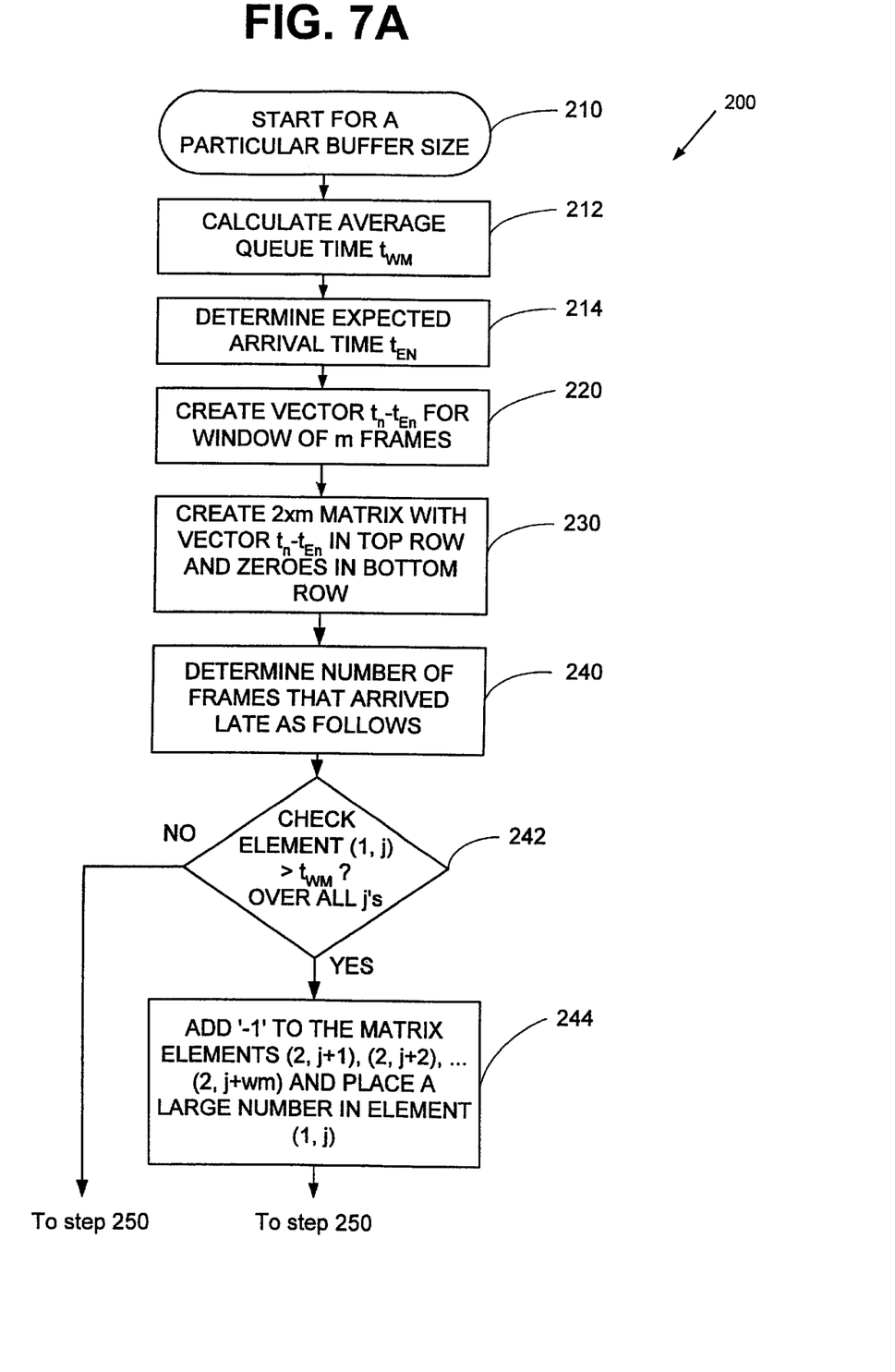
FIGS. 7A–7B is a flowchart of a portion of the process illustrated in the flowchart of FIG. 6 in accordance with the present invention.
Figure 7B:
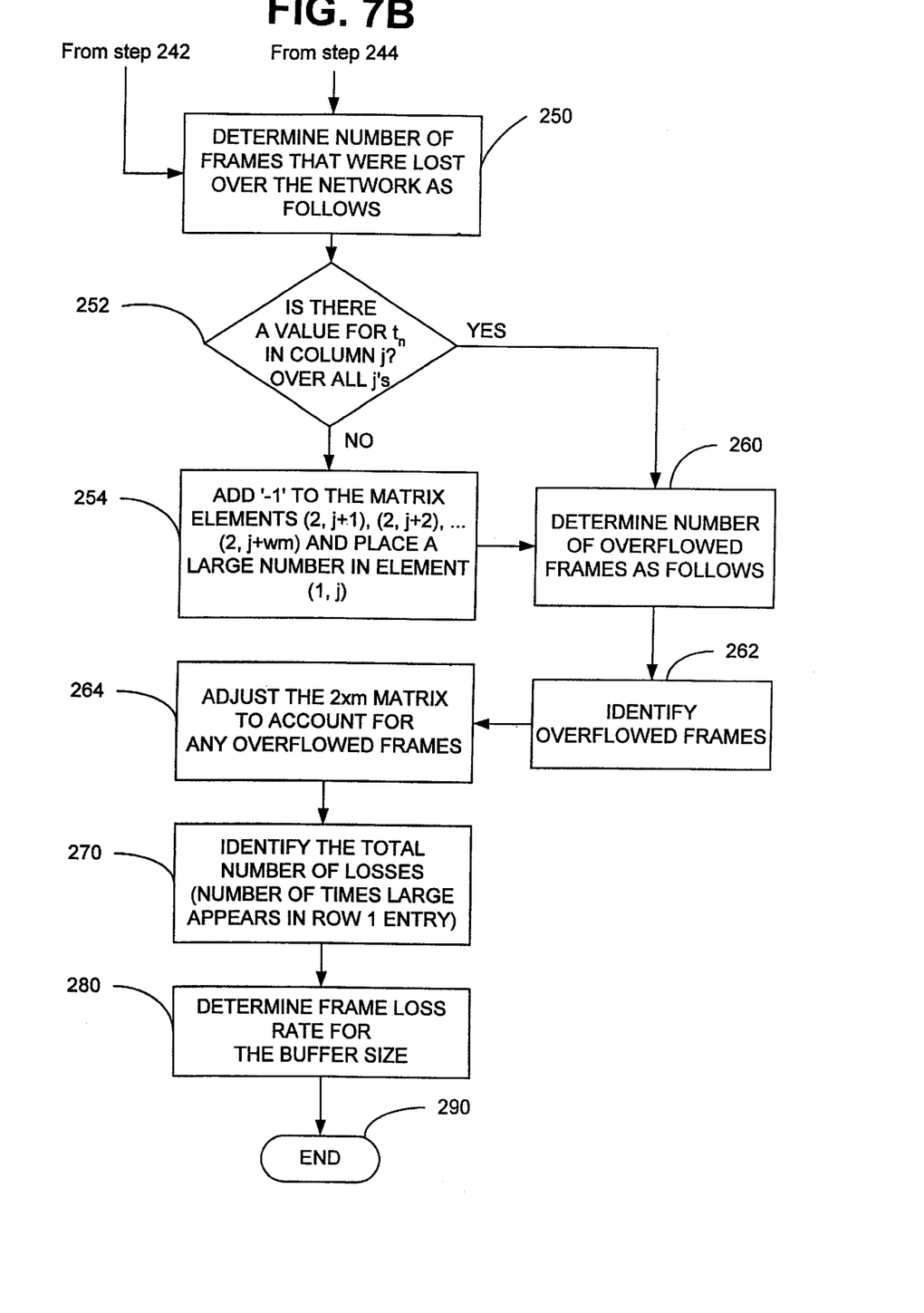

FIG. 7 is a control flowchart illustrating a portion of the method illustrated with respect to FIG. 6. The process 200 enters at start 210. It should be noted that the process of the present invention described below is implemented for each virtual buffer. Furthermore, in this exemplary embodiment it is assumed that there is one frame per packet. Once the frame loss is computed for each virtual buffer, an optimal buffer size is then chosen that provides a desirable amount of jitter compensation. At step 212, the average queue time for a frame is calculated. As such, $t_{WM}=WM*T_d$ and represents the average queue time a frame experiences at the jitter buffer. At step 214, based on the actual depletion time of the initial frame and the value of WM, the expected arrival times $t_{En}$ are determined. This can be done by first determining the arrival time of the zeroth packet $t_{Eo}$ or initial frame as follows:

$$t_{E0}=t_{d0}-t_{WM} \quad \text{Equation 1}$$

The expected arrival time of the $n^{th}$ packet is then determined by:

$$t_{En}=t_{E0}+n \times t_{WM} \text{ for } n \geq 1 \quad \text{Equation 2}$$

At step 220, using packet arrival data, a vector for $t_n-t_{En}$ over increasing n, for a sample window size of m frame intervals is created. At step 230, a 2×m matrix is created placing the comparative time between actual and expected arrival times of data packets, the $t_n-t_{En}$ vector in the top row of this matrix. The bottom row is filled with all zero's and tracks frame_num deficiencies relative to a WM resulting from lost, late or overflowed frames.

It should be noted that the column size m of the matrix is made as large as possible to provide adequate space for the matrix element entries. As a minimum:

$$m \geq 2 * \left\lceil \left( \frac{|maximum\ jitter|}{T_d} \right) \right\rceil$$

where $T_d$=frame duration and "⌈ ⌉" denotes a rounding up operation.

Frames that arrived too late to be decoded and would not have been buffered are accounted for at step 240. It is determined if a sample in matrix element (1, j) exceeds $t_{WM}$ per step 242. If yes, per step 244, −1 is added to the matrix elements (2, j+1), (2, j+2), . . . , (2, j+WM). The −1's track the resulting frame_num deficiency over the next WM number of frame intervals that frame would have been held in the buffer. Additionally, a very large number is placed in matrix element (1,j) to act as a flag identifying a frame loss. This number greatly exceeds $t_{WM}$. The large number is defined as LARGE=$10 \times t_{WM}$. This process is repeated for each column j in the 2×m matrix. If in step 242, it is determined that the sample matrix element (1,j) does not exceed $t_{WM}$ for all j's, then the process proceeds directly to step 250.

Step 250 accounts for samples or frames that cannot be calculated because the packet has been lost over the network or IP channel. In such a case, no value is available for $t_n$. Here, the interval the algorithm can wait for a packet arrival may be a variable, and should exceed the value of $t_{WM}$ associated with the largest buffer size of interest. Thus, per step 252, it is determined if there is a value for $t_n$ in each of the m columns. If there is no value available for $t_n$ in any column j, then per step 254, the value of LARGE and the appropriate −1's as in Step 244 are loaded. If there is a value available for $t_n$ for all j's, then the process proceeds directly to step 260.

It should be noted that each first row element is associated with an arriving sequence number. Ideally: $t_n=t_{En}=t_{dn}-t_{WM}$. In practice however, this is rarely true due to jitter. As such, the first row elements record where the $n^{th}$ packet arrived relative to its expected arrival. If a first row element is ≦0, the associated packet arrived early or precisely on time. If the value is >0, the packet arrived later than expected. Furthermore, the first row samples may be "projected" into the column associated with the actual arrival interval of this packet. For example, if element (1,7)=−32 ms, and $T_d$=20 ms, then this sample can be "projected" into the previous column (i.e. it actually arrived in the frame interval associated with column 6.)

Overflowed frames due to a burst of packet arrivals to the jitter buffer in a short period are accounted for per step 260. The overflowed frames are first identified at step 262. The identification is performed by moving left to right along the 2×m matrix, as follows. For a given column j with sequence number n, any future frames (such as, for example, columns: j+1, j+2, . . . ) that arrived at times $t_{En}$ or earlier are projected into column j. The number of future frames satisfying this condition are denoted by $E_f$ (number of extra frames). The absolute value of element (2,j) is stored in the variable $D_f$. The number of past frames which project beyond column j are then added to $D_f$. This is done by adding the total number of frames from elements (1,j−1), (1,j−2), . . . , (1,j−WM) that project beyond column j and do not take on the value LARGE. $D_f$ now represents the expected frame_num deficiency relative to the watermark due to lost, late or overflowed frames from past analysis intervals. $E_f$ is then compared to one of the thresholds in Table 1, depending on the case in question:

TABLE 1

Overflow detection table.

| If in the element, (1,j): | Even buffer threshold | Odd buffer threshold |
|---|---|---|
| $t_n - t_{En} \leq 0$ | $D_f + WM - 1$ | $D_f + WM$ |
| $t_n - t_{En} > 0$ | $D_f + WM$ | $D_f + WM + 1$ |

If the difference between $E_f$ and the threshold in question is positive, the resulting number is the number of overflowed frames.

Per step 264, the 2×m matrix is adjusted to account for any overflowed frames. For any column where overflow loss is identified, it is determined which frames actually overflowed. In such a case, the latest frames into the buffer are the first to overflow. Using projections from past and future time intervals, overflowed frames are identified until $E_f$ does not exceed the appropriate threshold listed in Table 1. For the frames identified as overflowed in the previous sub-step, the number LARGE is placed in the corresponding first row element, and −1 is added to the second row of the next WM number of frame intervals. This makes each overflowed frame "appear" late to the algorithm in subsequent analysis intervals. Thus, loss resulting from the overflow of these frames is tracked.

It should be noted that the only time a frame can be removed from the system due to buffer overflow is the time interval in which the corresponding packet arrives. Once the frame is buffered, it will eventually play out. Further it should be noted that for the beginning of a new Steady State period resulting from algorithm initialization or silence suppression, frames from a previous Steady State cannot project into the time intervals associated with the present Steady State, or vice versa. Additionally, the $t_{En}$ predictions are restarted such that tEo represents the expected arrival time of the first frame that drives the system to the present Steady State condition under analysis. Once this sequence of steps has been applied to the matrix in question, the total number of losses is identified as equal to the number of times the value LARGE appears in the entries of the first row as per step 270. At step 280, the resulting number may be divided by the total number of frames associated with this segment of the matrix, to determine the frame loss rate for the buffer size under consideration. This process is repeated for other buffer sizes of interest as described with respect to FIG. 6. In such a case, row 1 of the matrix is reset to the original $t_n-t_{En}$ data, row 2 is reset to all zero's and the matrix is altered as before.

One advantage of the system and the method of the present invention is that a smallest buffer size which yields a targeted frame loss rate is found. For a set of buffer sizes, the analysis may start with the smallest buffer size of interest. In practice, some frame loss rate is being targeted. Additionally, the loss rate for increasing buffer size is monotonically non-increasing. Therefore, the analysis may stop as soon as the buffer size being analyzed is shown to achieve a loss performance as good or better than the target loss rate. This is true as larger buffers will have loss rates that are at least as small. As a result, the analysis process can be skipped for the remaining buffer sizes of interest. This saves on the number of computations necessary to find the smallest buffer size which yields some targeted frame loss rate.

Tables 2 and 3 are exemplary matrices created by the method of the present invention as described with respect to FIG. 6. The tables, each demonstrate the matrix of interest for a segment of time intervals which are assumed to be in a Steady State period, for an even buffer with WM=2. Table 2 illustrates the matrix before loss analysis occurs while Table 3 illustrates the matrix after loss analysis takes place. The frame duration is assumed to be $T_d$=20 ms, and the entries in the first row of both matrices are expressed in milliseconds. Furthermore, the columns are labeled by using the expected sequence number 100 for that time interval to illustrate which frames are lost during overflow events.

In this particular example, the number of losses over the observed time are two. This results from the overflow of frame 102 in the time interval where frame 102 was expected. In time 102, the loss threshold is 1 (applying the threshold for the even buffer from Table 1). However, a total of three unexpected frames (101, 103, 104) also project into column 102. In particular, frames 103 and 104 contribute to the value of E, which is 2. Because frames 101, 103 and 104 arrive before 102, it is frame 102 that actually overflows.

It should also be noted that frame 106 has a value for $t_n-t_{En}$ that exceeds $t_{WM}$. As such, frame 106 is late in arriving. This identification also allows the proper analysis for frames 108 and 109. Specifically, the frame_num deficiency resulting from frame 106 not being buffered, facilitates the loading of frames 108 and 109 in column 107, without overflow. If the time in column 106 had been 3 for example, such a frame_num deficiency would not have existed and frame 107 would have overflowed in column 107.

TABLE 2

Example of a segment of the matrix loaded with the difference between expected and actual arrival times.

500

| | 100 | 101 | 102 | 103 | 104 | 105 | 106 | 107 | 108 | 109 | 110 | 111 |
|---|---|---|---|---|---|---|---|---|---|---|---|---|
| $t_n-t_{En}$ | 0 | 10 | -1 | -35 | -57 | -10 | 46 | -5 | -30 | -51 | 27 | 16 |
| Frame deficiency relative to WM | 0 | 0 | 0 | 0 | 0 | 0 | 0 | 0 | 0 | 0 | 0 | 0 |

TABLE 3

Matrix after the appropriate loss analysis. Here, frame 102 is lost due to overflow in the time associated with frame 102. Frame 106 is too late to be buffered.

| | 100 | 101 | 102 | 103 | 104 | 105 | 106 | 107 | 108 | 109 | 110 | 111 |
|---|---|---|---|---|---|---|---|---|---|---|---|---|
| $t_n-t_{En}$ | 0 | 10 | LARGE | -35 | -57 | -10 | LARGE | -5 | -30 | -51 | 27 | 16 |
| Frame deficiency relative to WM | 0 | 0 | 0 | -1 | -1 | 0 | 0 | -1 | -1 | 0 | 0 | 0 |

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

It should be readily apparent from the foregoing description and accompanying drawings that the calculations of the present invention for buffer size and performance may be used with other buffer systems not described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments hardware or firmware implementations or a combination of hardware and software may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for selecting a size of a buffer in a communication system for transmitting real time communications, the method comprising:

receiving a stream of transported data packets by a real time receiver, each data packet having at least one frame, the receiver comprising a plurality of jitter buffers having different sizes;

evaluating arrival statistics determined by comparing an expected arrival time and an actual arrival time of data packets to determine a frame loss rate, wherein evaluating the arrival statistics comprises:

computing an average queue time of a frame in the jitter buffer;

determining the expected time of arrival of the data packets;

creating a matrix having at least a first row, a second row and m columns, by placing the comparative times between actual and expected times of arrival of a sample of the transported data packets in the first row and clearing the second row;

determining a number of late frames;

determining a number of lost frames;

determining a number of overflowed frames; and adjusting the matrix to account for at least one of late, lost and overflowed frames; and selecting a buffer size that provides the frame loss rate that approximates a desired loss rate.

2. The method for selecting a size of a buffer of claim 1, wherein determining a number of late frames comprises:

determining if a sample in a first matrix element exceeds the average queue time of a frame in the jitter buffer; and tracking a number of frame deficiencies.

3. The method for selecting a size of a buffer of claim 1, wherein determining a number of lost frames comprises:

determining if a frame has arrived for a particular arrival time interval; and tracking a number of frame deficiencies.

4. The method for selecting a size of a buffer of claim 1, wherein determining a number of overflowed frames comprises:

analyzing the elements of the matrix by determining a first number of extra frames that arrive at a particular time interval and a second number of frame deficiencies;

comparing the first number of extra frames with a threshold; and determining a third number of overflowed frames.

5. A method for determining a jitter buffer size in a communication system for transmitting real time communications including a plurality of data packets, each data packet having at least one frame, the method comprising:

for a predetermined set of jitter buffer sizes, performing the following steps;

computing an average queue time of a frame in the jitter buffer of a first size;

determining expected arrival times of the frames;

creating a matrix having at least a first row, a second row and m columns, by placing the comparative times between actual and expected times of arrival of a sample of the data packets in the first row and clearing the second row;

determining a number of late frames;

determining a number of lost frames;

determining a number of overflowed frames;

adjusting the matrix to account for at least one of late, lost and overflowed frames;

determining a total loss rate of the frames;

comparing the loss rate determined of the frames to a desired loss rate; and selecting one of the predetermined set of jitter buffer sizes that approximates the desired loss rate for the size of the jitter buffer.

* * * * *